S. W. ROGERS.
Baking Pan.
No. 84,908.        Patented Dec. 15, 1868.
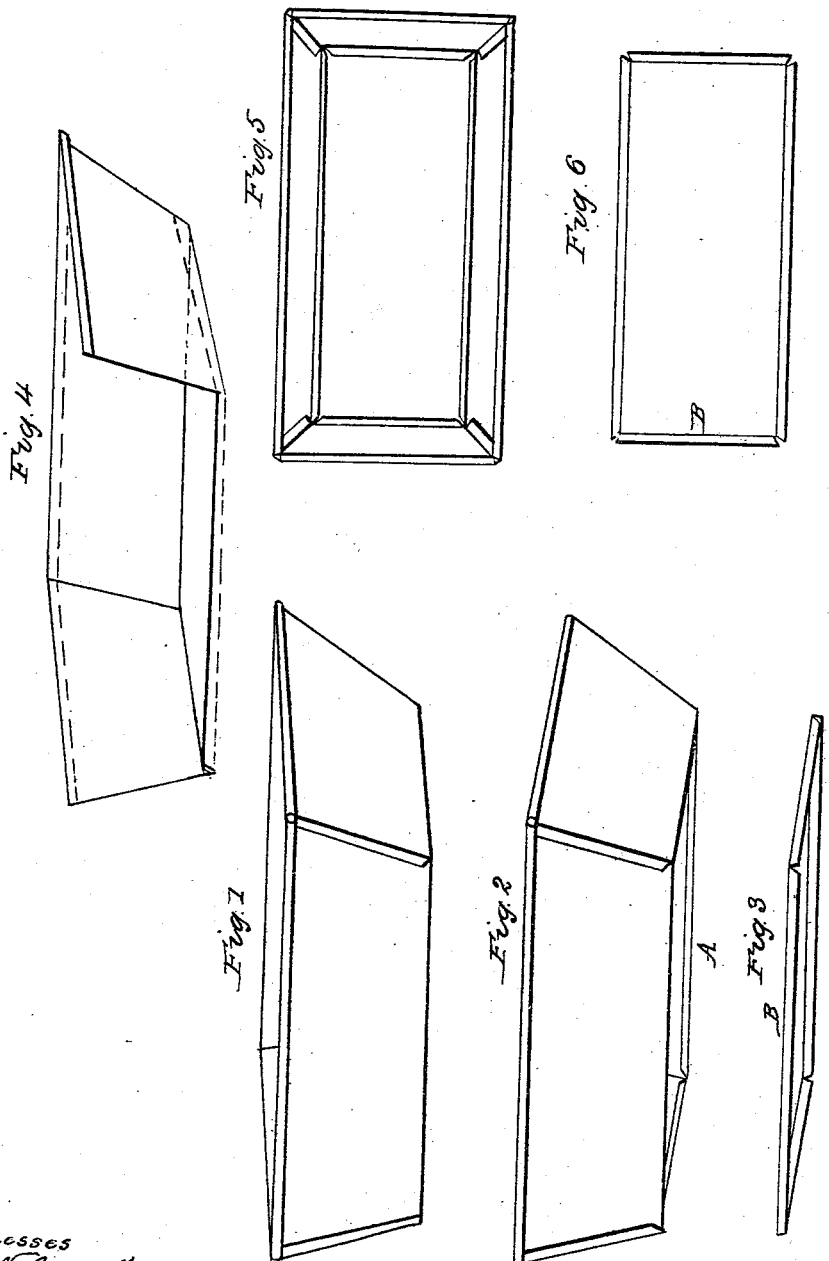

SULLIVAN W. ROGERS, OF HARWICH, MASSACHUSETTS.

Letters Patent No. 84,908, dated December 15, 1868.

BAKING-PAN.

The Schedule referred to in these Letters Patent and making part of the same.

*To all whom it may concern:*

Be it known that I, SULLIVAN W. ROGERS, of Harwich, in the county of Barnstable, in the State of Massachusetts, have invented a new and improved Baking-Pan; and I do hereby declare that the following is a full and exact description thereof, reference being had to the accompanying drawings, and to the letters of reference marked thereon.

The nature of my invention consists in providing a bottom to baking-pans, which bottom is easily removed, thereby causing the loaf to be taken out of pan free from breakage.

To enable others skilled in the art to make and use my invention, I will proceed to describe its construction and operation.

I construct the body or sides of my pan in any of the known forms, and turn up the bottom of the sides an eighth of an inch all around on the inside, as shown at A in the accompanying drawings.

I turn down the edge of the bottom an eighth of an inch all around, as shown at B, to fit exactly the groove made by the edge of the sides A. This raises the bottom an eighth of an inch from the bottom of oven, which gives the loaf a less tendency to burn at the bottom than the pan now in use, which bears upon the whole surface of bottom.

The bottom of my pan being easily removed, it obviates the difficulty of greasing the bottom and breaking the loaf, as are invariably done in using the common pan, for, by simply cutting around the sides, where it is necessary, and pressing the bottom of pan, the bottom and loaf come out together; and, where the bottom of loaf sticks to the bottom of pan, as it is apt to where there is no greasing of pan, by drawing a knife along the bottom, the loaf is left free from bottom without breakage.

What I claim as my invention, and desire to secure by Letters Patent, is—

False-bottom baking-pans, as herein described, of any size or shape.

SULLIVAN W. ROGERS.

Witnesses:
 GEORGE N. MUNSELL,
 WM. H. UNDERWOOD.